United States Patent [19]

Agrama

[11] 4,386,786
[45] Jun. 7, 1983

[54] ADJUSTABLE PUMP SEAL WITH TAPERED CONICAL MEMBERS

[75] Inventor: Ali Agrama, Freemont, Calif.
[73] Assignee: Merck & Co., Inc., Rahway, N.J.
[21] Appl. No.: 346,697
[22] Filed: Feb. 8, 1982
[51] Int. Cl.³ .............................................. F16J 15/40
[52] U.S. Cl. ...................................... 277/135; 277/13; 277/170
[58] Field of Search ...................... 277/1, 3, 13, 14 R, 277/14 V, 27, 135, 138, 170–172, 236, 237

[56] References Cited

U.S. PATENT DOCUMENTS

| | | |
|---|---|---|
| 333,049 | 12/1885 | Archibald . |
| 781,648 | 2/1905 | Graham et al. . |
| 897,189 | 8/1908 | Belluzzo ................................ 277/14 |
| 991,225 | 5/1911 | Morton ................................ 277/135 |
| 2,574,773 | 11/1951 | Bannister . |
| 3,114,322 | 12/1963 | Leonard, Jr. . |
| 3,195,466 | 7/1965 | Young . |
| 3,471,157 | 10/1969 | Swearingen ..................... 277/135 X |
| 3,774,879 | 11/1973 | Zink ..................................... 251/303 |
| 3,877,844 | 4/1975 | Klaus et al. ......................... 417/420 |
| 4,198,063 | 4/1980 | Shimizu et al. ................. 277/170 X |
| 4,304,411 | 12/1981 | Wilcock et al. ................. 277/135 X |

*Primary Examiner*—Robert S. Ward, Jr.
*Attorney, Agent, or Firm*—Mario A. Monaco; Michael C. Sudol, Jr.

[57] ABSTRACT

A pump is provided with an adjustable tapered seal mechanism so that when wear occurs a simple adjustment is required rather than a dismantling of the pump and replacement with a new seal.

4 Claims, 3 Drawing Figures

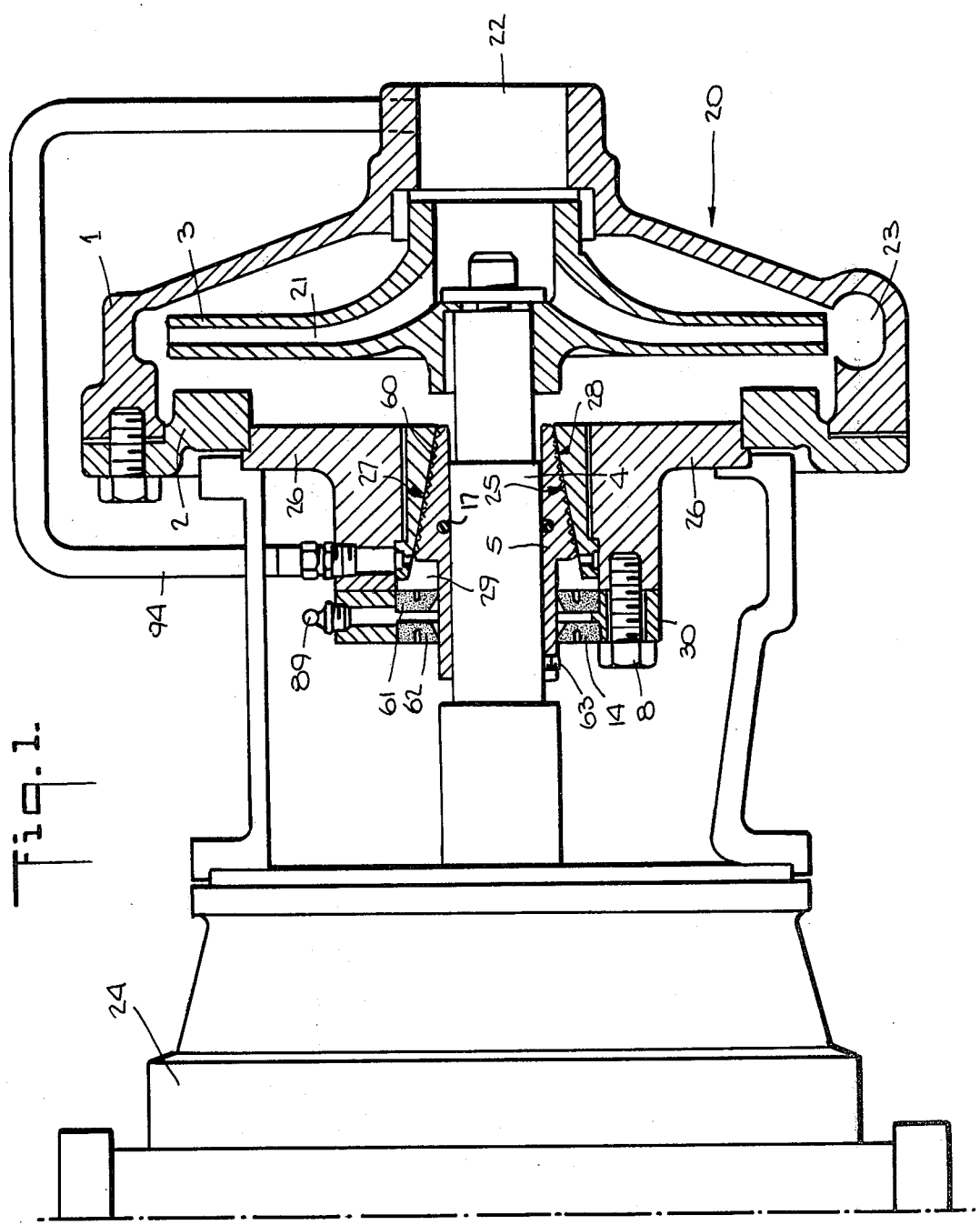

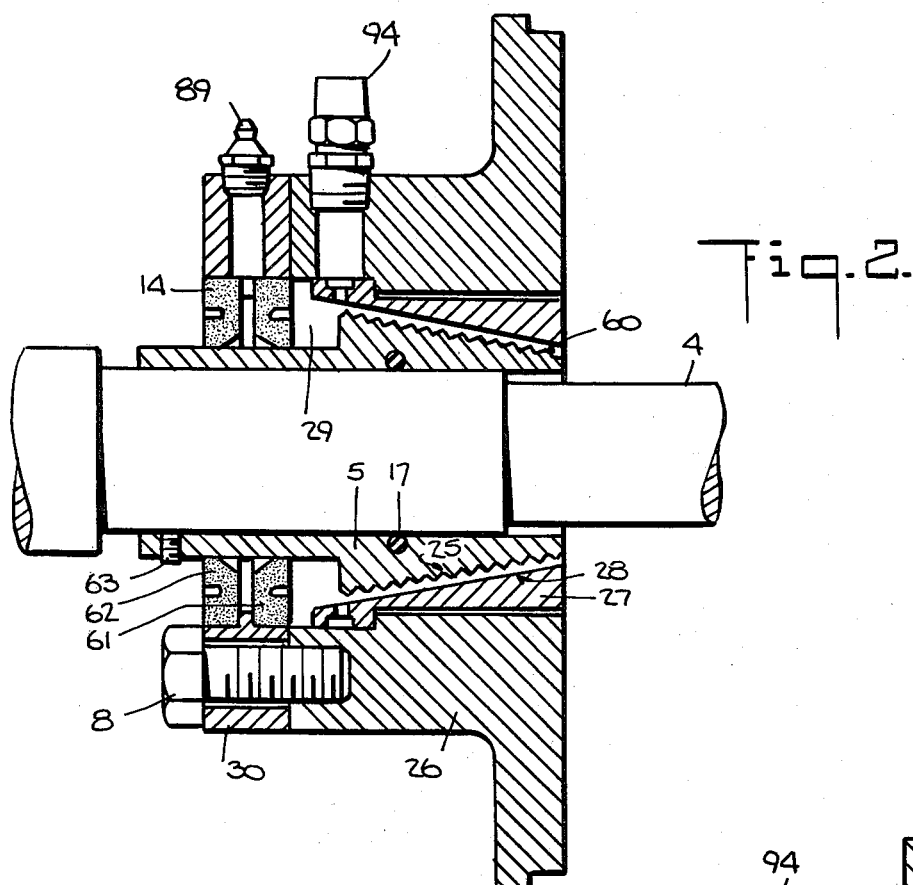
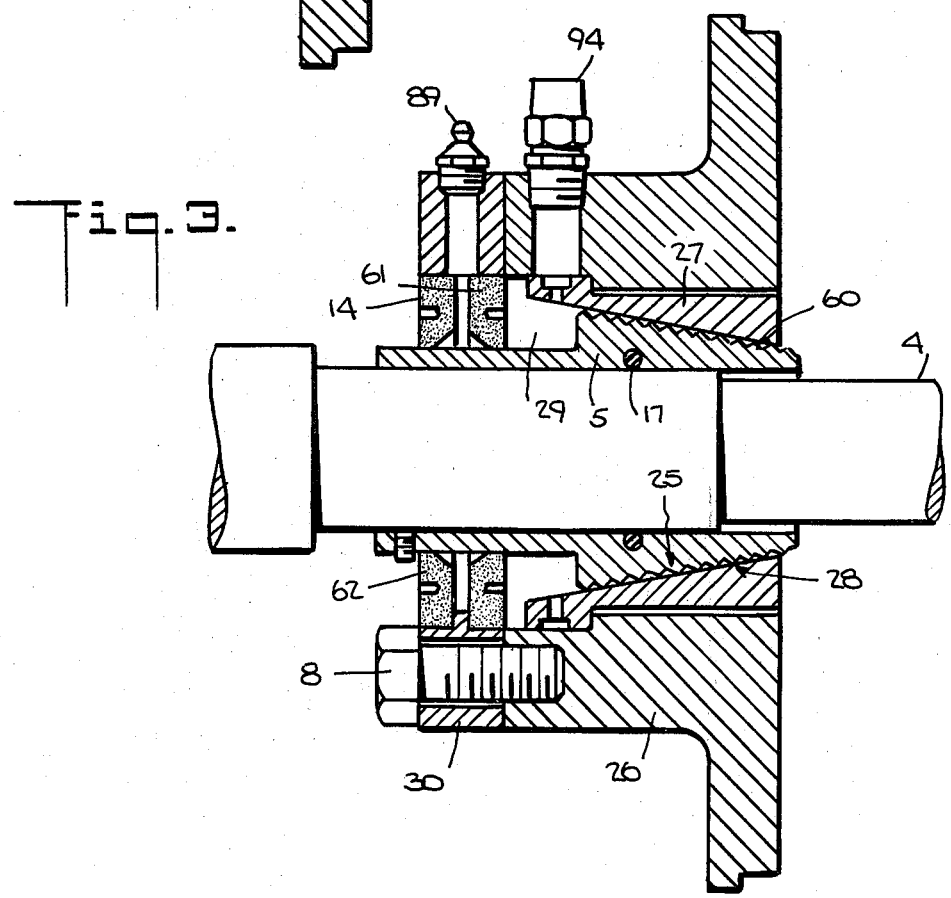

ADJUSTABLE PUMP SEAL WITH TAPERED CONICAL MEMBERS

BACKGROUND OF INVENTION

There have been many problems with mechanical seals known in the art in the pump area. For example, many of the mechanical seals resulted in the wearing, cracking and leaking, and contamination by debris in the liquid being pumped which marred the face of the seal. Also many of the prior art mechanical seals resulted in breakage during assembly and required complete disassembly of the liquid end of the pump to replace the seal. Furthermore, many of the prior art seal bellows tended to lock on the shaft of the pump which caused problems on the adjustable bearing frames. As stated previously, many of the seals used in the prior art necessitated removal of the housing and impeller and also the set ring to expose and be able to remove the seal and replace it with a new one.

SUMMARY OF THE INVENTION

In accordance with the present invention a pump is provided having an adjustable seal so that when wear occurs it is only necessary to adjust the clearance between the sleeve and bushing and replace if necessary only inexpensive greaselip seals.

Thus, it is an object of this invention to provide a pump with a type of seal, namely a sleeve and bushing which does not need replacement each time there is some wear of the seal. Should wear occur the sleeve is adjustable to reset the clearance between the sleeve and bushing while the pump is still assembled.

It is another object of this invention to provide regular or split grease (lip) seals in conjunction with the sleeve and bushing, which split grease seals can be easily replaced if necessary.

It is a still further object of this invention to recirculate what little overflow occurs from the seal housing back to the pump inlet section.

To better describe the invention one can refer to FIG. 1 and 2 in the instant case.

FIG. 1 shows a cutaway view of a complete pump assembly with the sealing means of this invention.

FIG. 2 is a cutaway view of the actually sealing means of this invention at the start of operation and FIG. 3 is a cutaway view of the sealing means of this invention with the clearance reset.

Referring now to FIGS. 1-3 there is provided a pump 20 comprising a volute section 1 which is connected generally, by means of bolts or screws to a backplate shown as 2. An impeller 3 is located on a shaft 4 and extends into the cavity formed by the volute and backplate. The impeller can be opened or closed with vanes 21 through which liquid or any pumpable material flows. The liquid enters the pump through the pump inlet 22 and leaves through the pump outlet 23 going through the vanes 21 of the impeller 3. Although a closed impeller is shown through which the liquid passes, any other type impeller can be used in any type centrifugal pump. The shaft 4 is rotatably attached to a motor 24 which drives said impeller. Attached to the backplate and encompassing the shaft is a seal housing 26 which seal housing forms the back of the pump and surrounds the shaft and sealing means. Immediately surrounding the shaft adjacent to the seal housing 26 and rotatable therewith is an adjustable sleeve 5, made of appropriate metalic or non metalic material and having a conical tapered surface 25. Adjacent the conical surface 25 is an oppositely tapered conical-shaped bushing 27, which restricts the leakage through a close clearance between surface 25 of sleeve 5, and surface 28 of bushing 27. Surfaces 25 and 28 are adjacent each other. Both tapered surfaces 28 and 25 of the bushing and sleeve are concentric around the shaft. The bushing 27 is not movable or rotatable and is attached to or made part of the seal housing. Sleeve 5 is adjustable by way of set screw 63 attached at one end of the sleeve. There is further provided on o-ring 17, around the shaft and within the sleeve 5, to prevent leakage between shaft 4 and sleeve 5.

There is further provided a greaselip seal 14 which can be a regular or split seal (in FIG. 1-3 a split seal is shown) which surrounds the sleeve 5. There is further provided on the greaselip seal 14, a grease fitting 89, whereby one can lubricate the greaselip seal. A seal cap 30 holds the greaselip seal 14 in place around the shaft 4. A tube connector 94, which leads from the cavity 29 formed by the sleeve 5, the bushing 27, and the seal-housing 26 to the inlet of the pump 22. This cavity 29 communicates through the tube connector 94 to the inlet region of the pump housing 22. Finally, a cap screw 8 holds the grease seal assembly against the shaft 4 and is attached to the seal housing 26 thus forming also the above described cavity 29.

In operation, the seal works as follows: The shaft 4 driven by the motor 24 rotates the impeller 3 and liquid or material to be pumped enters the inlet 22 and is pumped out the outlet 23 by the impeller 3. The shaft is rotatably mounted within the seal housing and when rotating the sealing means comes into play. When wear occurs one can adjust this seal by unscrewing set screw 63 and moving the tapered sleeve 5 forward toward the impeller 3. The sleeve 5 can be moved forward only a distance to where the set screw is readily accessible. However, the greaselip seal 14 can also be easily removed should the sleeve have to be moved forward a distance where normally the set screw would then be covered by the grease seal. A special feature of this invention is that should leakage occur between the sealing means of the bushing 27 and sleeve 5, such that liquid enters cavity 29 the liquid will flow through the tube connector 94 back to the pump housing or inlet 22. The tube connector 94 allows any leakage of pressure or material to be circulated around to the pump inlet 22.

The taper on the sleeve can be threaded with threads 60 particularly with the threads being on the sleeve taper surface 25 to further increase pressure drop and reduce leakage which is recirculated back to the pump section. The number of threads per inch of the tapered sleeve surface 25 and the thread pitch are not critical to my invention and any standard pitch and number of threads can be used. The thread direction however must be such that when the sleeve rotates any liquid which leaks therethrough must be forced back towards the impeller and the interior of said pump.

The greaselip seals 14 used in this invention can be any type greaselip seal known in the art. Particularly, it can be one with a split seal whereby the inner seal 61 is used to prevent leakage to the atmosphere and the outer seal 62 is used to prevent air from entering the pump while priming. As stated previously, the two seals of the grease seal 14 are grease lubricated through the grease fitting 89.

The previously described material is an illustration of my invention and should not be considered a limitation thereof. Other obvious equivalents known in the art are intended to be covered by this invention.

What is claimed is:

1. An adjustable seal for a pump having a housing and an impeller mounted on a rotatable shaft which comprises:
   (a) a seal housing;
   (b) a bushing fixedly mounted on said seal housing having a tapered conical shaped outer surface;
   (c) a sleeve having a tapered conical outer surface surrounding the impeller shaft and rotatable therewith and slidably movable thereon, said outer surface being adjacent the outer surface of said bushing;
   (d) an O-ring between the impeller shaft and the sleeve to prevent leakage between shaft and sleeve;
   (e) a grease seal resting on one end of said sleeve and being fixedly secured to said seal housing;
   (f) means to slidably move and adjust said sleeve along said shaft when wear occurs on said sleeve and bushing so that the adjacent tapers of the sleeve and bushing are in close proximity to form a seal.

2. The adjustable seal for a pump of claim 1 wherein the bushing, sleeve, grease seal and seal housing form a cavity with an opening to the pump housing along with the said tapers of the sleeve and bushing and a tube connector leading from said cavity to said pump housing to allow for recirculation of any flow that does occur along said tapered surfaces.

3. An adjustable seal for a pump of claim 1 wherein the means of item (f) is a set screw.

4. An adjustable seal for a pump of claim 1 wherein the tapered surfaces of the sleeve have threads thereon.

* * * * *

UNITED STATES PATENT AND TRADEMARK OFFICE
CERTIFICATE OF CORRECTION

PATENT NO. : 4,386,786

DATED : JUNE 7, 1983

INVENTOR(S) : ALI AGRAMA

It is certified that error appears in the above—identified patent and that said Letters Patent is hereby corrected as shown below:

On the title page:
Assignee should be: BALTIMORE AIRCOIL CO., INC., Jessup, Maryland Signed and Sealed this Twenty-third Day of August 1983

[SEAL]

Attest:

Attesting Officer

GERALD J. MOSSINGHOFF

Commissioner of Patents and Trademarks